3,231,465
INSECTICIDAL 5-HALO-3-PHENYL-
SALICYLANILIDES
Jack D. Early, Florissant, Mo., assignor to Monsanto
Company, St. Louis, Mo., a corporation of Delaware
No Drawing. Filed Nov. 16, 1962, Ser. No. 238,267
9 Claims. (Cl. 167—30)

This invention relates to methods of combatting insect life, and also to formulations useful therefor.

In accordance with this invention it has been found that insect life can be effectively combatted by subjecting same to the action of at least one 5-halo-3-phenylsalicylanilide of the formula

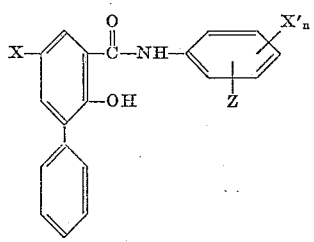

wherein X is halogen of atomic weight in the range of 35 to 80 (i.e., chlorine or bromine), wherein Z is hydrogen or methyl, wherein X' is halogen of atomic weight in the range of 18 to 80 (i.e., fluorine, chlorine or bromine), and wherein $n$ is a whole number from 1 to 3.

Of the 5-halo-3-phenylsalicylanilides of the foregoing formula these wherein Z is hydrogen and wherein X and X' are like or unlike halogens of atomic weight in the range of 35 to 80 (i.e., chlorine or bromine) are a particularly economical and effective group for combatting chewing insects, as for example the species of the respective orders Lepidoptera and Orthoptera. In combatting various species of the order Lepidoptera, particularly the species of the family Phalaenidae (sometimes termed Noctuidae), the larvae of which are extremely destructive to crops, the 5-chloro-3-phenylsalicylanilides of the formula

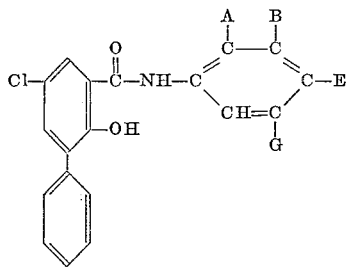

wherein A, B, E and G are hydrogen or chlorine but wherein at least one but not more than three of said A, B, E and G being chlorine, are particularly outstanding.

The aforedescribed 5-halo-3-phenylsalicylanilides are readily prepared in accordance with the procedure set forth in U.S. 2,865,861, i.e. reacting a substituted aniline of the formula

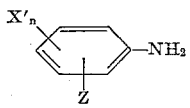

wherein X', $n$ and Z have the aforedescribed significance or mixtures thereof with a substantially equimolecular proportion of a phenyl ester of a 5-halo-3-phenylsalicylic acid of the formula

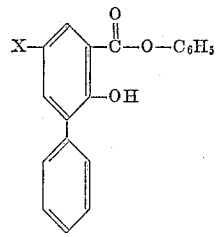

wherein X has the aforedescribed significance or mixtures thereof in the presence of an inert organic solvent at the reflux temperature of the system. To illustrate such is the following:

*Example I*

Approximately 9.4 parts by weight of p-chloroaniline, approximately 19.0 parts by weight of phenyl 5-chloro-3-phenylsalicylate and approximately 15 parts by weight of 1,2,4-trichlorobenzene are intimately mixed and heated at 210–245° C. over a period of 5–6 hours while distilling forward a mixture of phenol and 1,2,4-trichlorobenzene. The residue is then cooled and allowed to stand overnight. The solidified mass is then washed with dilute hydrochloric acid then with water and dried. Upon recrystallization from benzene, followed by recrystallization from aqueous ethanol 4',5-dichloro-3-phenylsalicylanilide (M.P. 149.1–150.2° C.) is obtained as white coarse needles.

*Example II*

Employing the procedure of Example 1 but replacing p-chloroaniline with an equimolecular amount of 2,4,5-trichloroaniline there is obtained 2',4',5,5'-tetrachloro-3-phenylsalicylanilide, a solid which melts at 156–157° C.

*Example III*

Employing the procedure of Example I but replacing phenyl 5-chloro-3-phenylsalicylate with an equimolecular amount of phenyl 5-bromo-3-phenylsalicylate there is obtained 4'-chloro-5-bromo-3-phenylsalicylanilide, a solid.

*Example IV*

Employing the procedure of Example I but replacing p-chloroaniline with an equimolecular amount of p-fluoroaniline there is obtained 4'-fluoro-5-chloro-3-phenylsalicylanilide, a solid which melts at 150–153° C.

*Example V*

Employing the procedure of Example I but replacing p-chloroaniline with an equimolecular amount of 3,4-dichloroaniline there is obtained 3',4',5-trichloro-3-phenylsalicylanilide, a solid which melts at about 111° C.

*Example VI*

Employing the procedure of Example I but replacing p-chloroaniline with an equimolecular amount of 3,4-dibromoaniline there is obtained 3',4'-dibromo-5-chloro-3-phenylsalicylanilide, a solid.

*Example VII*

Employing the procedure of Example I but replacing p-chloroaniline and phenyl 5-chloro-3-phenylsalicylate, respectively with equimolecular proportions of p-bromoaniline and 5-bromo-3-phenylsalicylate there is obtained 3',4',5-tribromo-3-phenylsalicylanilide, a solid.

*Example VIII*

Employing the procedure of Example I but replacing p-chloroaniline with an equimolecular amount of 2,5-dichloroaniline there is obtained 2',5,5'-trichloro-3-phenylsalicylanilide, a solid which melts at 140–142° C.

Example IX

Employing the procedure of Example I but replacing p-chloroaniline with an equimolecular amount of 2-chloro-4-bromoaniline there is obtained 2',5-dichloro-4'-bromo-3-phenylsalicylanilide, a solid.

Example X

Employing the procedure of Example I but replacing p-chloroaniline with an equimolecular amount of m-chloroaniline there is obtained 3',5-dichloro-3-phenylsalicylanilide, a solid which melts at 146–147° C.

Example XI

Employing the procedure of Example I but replacing p-chloroaniline with an equimolecular amount of m-bromoaniline there is obtained 3'-bromo-5-chloro-3-phenylsalicylanilide, a solid.

Example XII

Employing the procedure of Example I but replacing p-chloroaniline with phenyl 5-chloro-3-phenylsalicylate respectively with equimolecular proportions of m-bromoaniline and 5-bromo-3-phenylsalicylate there is obtained 3',5-dibromo-3-phenylsalicylanilide.

Example XIII

Employing the procedure of Example I but replacing p-chloroaniline with an equimolecular amount of 3,5-dichloroaniline there is obtained 3',5,5'-trichloro-3-phenylsalicylanilide, a solid which melts at 238–240° C.

Example XIV

Employing the procedure of Example I but replacing p-chloroaniline with an equimolecular amount of 3,5-dibromoaniline there is obtained 3',5'-dibromo-5-chloro-3-phenylsalicylanilide, a solid.

Example XV

Employing the procedure of Example I but replacing p-chloroaniline with an equimolecular amount to 2,5-dibromoaniline there is obtained 2',5'-dibromo-5-chloro-3-phenylsalicylanilide, a solid which melts at 164–165° C.

Example XVI

Employing the procedure of Example I but replacing p-chloroaniline with an equimolecular amount of 2,4-dibromoaniline there is obtained 2',4'-dibromo-5-chloro-3-phenylsalicylanilide, a solid which melts at 161–164° C.

Example XVII

Employing the procedure of Example I but replacing p-chloroaniline with an equimolecular amount of 2,4-difluoroaniline there is obtained 2',4'-difluoro-5-chloro-3-phenylsalicylanilide, a solid which melts at 150–151° C.

Example XVIII

Employing the procedure of Example I but replacing p-chloroaniline and phenyl 5-chloro-3-phenylsalicylate respectively with equimolecular proportions of 3,4-dichloroaniline and phenyl 5-bromo-3-phenylsalicylate there is obtained 3',4'-dichloro-5-bromo-3-phenylsalicylanilide, a solid which melts at 111–112° C.

Example XIX

Employing the procedure of Example I but replacing p-chloroaniline with an equimolecular amount of 2,4,6-trichloroaniline there is obtained 2',4',5,6'-tetrachloro-3-phenylsalicylanilide, a solid which melts at 189–192° C.

Example XX

Employing the procedure of Example I but replacing p-chloroaniline with an equimolecular amount of 2,6-dichloro-4-bromoaniline there is obtained 2',5,6'-trichloro-4'-bromo-3-phenylsalicylanilide, a solid.

Example XXI

Employing the procedure of Example I but replacing p-chloroaniline with an equimolecular amount of 2,3-dichloroaniline there is obtained 2',3',5-trichloro-3-phenylsalicylanilide, a solid which melts at 131–132° C.

Example XXII

Employing the procedure of Example I but replacing p-chloroaniline and phenyl 5-chloro-3-phenylsalicylate respectively with equimolecular proportions of 2,4-difluoroaniline and phenyl-5-bromo-3-phenylsalicylate there is obtained 2',4'-difluoro-5-bromo-3-phenylsalicylanilide, a solid.

Example XXIII

Employing the procedure of Example I but replacing p-chloroaniline with an equimolecular amount of 2-chloro-4-fluoroaniline there is obtained 2',5-dichloro-4'-fluoro-3-phenylsalicylanilide, a solid.

Example XXIV

Employing the procedure of Example I but replacing p-chloroaniline with an equimolecular amount of 2,4,5-tribromoaniline there is obtained 2',4',5'-tribromo-5-chloro-3-phenylsalicylanilide, a solid.

Example XXV

Employing the procedure of Example I but replacing p-chloroaniline with an equimolecular amount of 3,4,5-trichloroaniline there is obtained 3',4',5',5-tetrachloro-3-phenylsalicylanilide, a solid.

Example XXVI

Employing the procedure of Example I but replacing p-chloroaniline with an equimolecular amount of 2,6-dibromo-4-chloroaniline there is obtained 2',6'-dibromo-4',5-dichloro-3-phenylsalicylanilide, a solid.

Example XXVII

Employing the procedure of Example I but replacing p-chloroaniline and phenyl 5-chloro-3-phenylsalicylate respectively with equimolecular amounts of 2,4,5-tribromoaniline and phenyl 5-bromo-3-phenylsalicylate there is obtained 2',4',5,5'-tetrabromo-3-phenylsalicylanilide, a solid.

Example XXVIII

Employing the procedure of Example I but replacing p-chloroaniline with an equimolecular amount of 4-chloro-o-toluidine there is obtained 4',5-dichloro-2'-methyl-3-phenylsalicylanilide, a solid which melts at 148–149° C.

Example XXIX

Employing the procedure of Example I but replacing p-chloroaniline with an equimolecular amount of 4-bromo-o-toluidine there is obtained 4'-bromo-5-chloro-2'-methyl-3-phenylsalicylanilide, a solid.

Example XXX

Employing the procedure of Example I but replacing p-chloroaniline with an equimolecular amount of 2-chloro-p-toluidine there is obtained 2',5-dichloro-4'-methyl-3-phenylsalicylanilide, a solid which melts at 139–142° C.

Example XXXI

Employing the procedure in Example I but replacing p-chloroaniline with an equimolecular amount of 3-chloro-2-methylaniline there is obtained 3',5-dichloro-2'-methyl-3-phenylsalicylanilide, a solid which melts at 142–143° C.

Example XXXII

Employing the procedure of Example I but replacing p-chloroaniline with an equimolecular amount of 2-chloro-5-methylaniline there is obtained 2',5-dichloro-5'-methyl-3-phenylsalicylanilide, a solid which melts at 142–143° C.

Example XXXIII

Employing the procedure of Example I but replacing p-chloroaniline with an equimolecular amount of 4-fluoro-m-toluidine there is obtained 4′-fluoro-5-chloro-3′-methyl-3-phenylsalicylanilide, a solid.

Example XXXIV

Employing the procedure of Example I but replacing p-chloroaniline with an equimolecular amount of 4-chloro-m-toluidine there is obtained 4′,5-dichloro-3′-methyl-3-phenylsalicylanilide, a solid which melts at 128–129° C.

Example XXXV

Employing the procedure of Example I but replacing p-chloroaniline with an equimolecular amount of 4-fluoro-o-toluidine there is obtained 4′-fluoro-5-chloro-2′-methyl-3-phenylsalicylanilide, a solid.

For the purpose of demonstrating the insecticidal properties of the 5-halo-3-phenylsalicylanilides of this invention the following analogous materials were prepared.

Example A

Employing the procedure of Example I but replacing p-chloroaniline and phenyl 5-chloro-3-phenylsalicylate respectively with equimolecular amounts of aniline and phenyl 5-chlorosalicylate there is obtained 5-chlorosalicylanilide, a solid.

Example B

Employing the procedure of Example I but replacing p-chloroaniline with an equimolecular amount of aniline there is obtained 5-chloro-3-phenylsalicylanilide, a solid.

Example C

Employing the procedure of Example I but replacing p-chloroaniline and phenyl 5-chloro-3-phenylsalicylate respectively with equimolecular amounts of 3,4-dichloroaniline and phenyl 3-phenylsalicylate there is obtained 3′,4′-dichloro-3-phenylsalicylanilide, a solid.

Example D

Employing the procedure of Example I but replacing p-chloroaniline and phenyl 5-chloro-3-phenylsalicylate respectively with equimolecular amounts of 3,4-dichloroaniline and phenyl 3-chloro-5-phenylsalicylate there is obtained 3′,3,4′-trichloro-5-phenylsalicylanilide, a solid.

Example E

Employing the procedure of Example I but replacing p-chloroaniline and phenyl 5-chloro-3-phenylsalicylate respectively with equimolecular amounts of 3,4-dichloroaniline and phenyl 5-chloro-4-hydroxy-3-phenylbenzoate there is obtained 4-hydroxy-3-phenyl-3′,4′,5-trichlorobenzanilide, a solid.

As illustrative of the insecticidal activity of the 5-halo-3-phenylsalicylanilides of this invention and that of analogues thereof the below itemized were evaluated as follows against a species of the family Phalaenidae of the order Lepidoptera.

A primary base solution of the compound to be evaluated is prepared by dissolving 100 mg. of the compound in 10 ml. of acetone. Then a 1.0 ml. aliquot of this primary base solution is diluted with 9 ml. of acetone to provide a solution containing 1.0 microgram per microliter of the compound to be evaluated. This latter solution is transferred to a 0.25 cc. hypodermic syringe which syringe is then placed in a topical treatment device calibrated to deliver one microliter per stroke. The applicator lever is pressed several times to make certain no air bubbles are trapped in the needle and the needle is wiped with filter paper to remove any excess solution. The applicator lever is pressed once to deliver one microliter which is applied directly to each of 12 lima bean leaf discs 0.25 inch in diameter. Individual second instar southern armyworm larvae (*Prodenia eridania*) are placed beside each disc and the disc and larva encaged with a plastic cap 0.875 inch in diameter. After 48 hours at room temperature mortality observations are made. The following results were obtained:

| Compound: | Percent kill at 1.0 microgram per larva |
|---|---|
| 2′,4′,5,5′-tetrachloro-3-phenylsalicylanilide | 100 |
| 3′,4′,5-trichloro-3-phenylsalicylanilide | 100 |
| 2′,5,5′-trichloro-3-phenylsalicylanilide | 100 |
| 2′,4′,5-trichloro-3-phenylsalicylanilide | 100 |
| 4′,5-dichloro-3-phenylsalicylanilide | 100 |
| 3′,5-dichloro-3-phenylsalicylanilide | 100 |
| 3′,5,5′-trichloro-3-phenylsalicylanilide | 100 |
| 2′,5′-dibromo-5-chloro-3-phenylsalicylanilide | 100 |
| 2′,4′-dibromo-5-chloro-3-phenylsalicylanilide | 92 |
| 2′,4′-difluoro-5-chloro-3-phenylsalicylanilide | 100 |
| 3′,4′-dichloro-5-bromo-3-phenylsalicylanilide | 100 |
| 2′,4′,5,6′-tetrachloro-3-phenylsalicylanilide | 100 |
| 4′,5-dichloro-2′-methyl-3-phenylsalicylanilide | 83 |
| Salicylic acid | 0 |
| Salicylanilide | 0 |
| 5-chlorosalicylanilide | 0 |
| 5-chloro-3-phenylsalicylic acid | 0 |
| 5-chloro-3-phenylsalicylanilide | 8 |
| 3′,4′-dichloro-3-phenylsalicylanilide | 0 |
| 3′,3,4′-trichloro-5-phenylsalicylanilide | 0 |
| 4-hydroxy-3-phenyl-3′,4′,5-trichlorobenzanilide | 0 |
| 3′,3,4′,5-tetrachlorosalicylanilide | 0 |

The 5-halo-3-phenylsalicylanilides of this invention are effective against families of insects other than Phalaenidae of the order Lepidoptera. For example, in a similar feeding evaluation to that above (1) 2′,4′,5-trichloro-3-phenylsalicylanilide at a concentration of 2.0 micrograms per larva of the leaf roller (Archips) of the family Tortricidae exhibited an 80% kill, (2) 2′,4′,5-trichloro-3-phenylsalicylanilide at a concentration of 2.0 micrograms per larva of the spring cankerworm (*Paleacrita vernata*—Peck) of the family Geometridae exhibited a 66% kill, (3) 2′,5,5′-trichloro-3-phenylsalicylanilide at a concentration of 1.0 microgram per larva of the fall webworm (*Hyphantria cunea*—Drury) of the family Arctiidae exhibited a 42% kill, (4) 2′,5,5′-trichloro-3-phenylsalicylanilide at a concentration of 1.0 milligram per larva of the salt marsh caterpillar (*Estigmene acrea*—Drury) of the family Arctiidae exhibited a 100% kill, and (5) 2′,5,5′-trichloro-3-phenylsalicylanilide at a concentration of one percent by weight exhibited a complete kill of the bagworm (*Thyridopteryx ephemeraeformis*—Haworth) of the family Psychidae.

The 5-halo-3-phenylsalicylanilides are effective against the chewing insect order Orthoptera, e.g., 2′,4′,5-trichloro-3-phenylsalicylanilide at a concentration of 2.0 micrograms per adult grasshopper (*Melanoplus differentialis*—Thomas) of the family Acridiidae exhibited an 83% kill on contact.

The 5-halo-3-phenylsalicylanilides of this invention are effective in control of mosquito larvae (*Aedes aegypti*—Linn.) of the family Culicidae of the order Diptera, e.g., at a concentration of 8 p.p.m. 2′,5,5′-trichloro-3-phenylsalicylanilide exhibited a 63% kill against said mosquito larvae.

Although the salicylanilides of this invention are useful per se in controlling a wide variety of insect pests, it is preferable that they be supplied to the pests or to the environment of the pests in a dispersed form in a suitable extending agent.

In the instant specification and appended claims it is to be understood that the term "dispersed" is used in its widest possible sense. When it is said that the salicylanilides of this invention are dispersed, it means that the particles of the salicylanilides of this invention may be molecular in size and held in true solution in a suitable organic solvent. It means further, that the particles may be colloidal in size and distributed throughout a liquid phase in the form of suspensions or emulsions or in the form of particles held in suspension by surface-active agents of a non-ionizing character. It also includes particles which are distributed in a semi-solid viscous carrier such as petrolatum or other ointment base of a non-ionizing character in which they may be actually dissolved in the semi-solid or held in suspension in the semi-solid with the aid of suitable non-ionizing surface-active agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the salicylanilides of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the salicylanilides of this invention are dispersed. It includes, therefore, the solvents of a true solution, the liquid phase of suspensions, emulsions or aerosols, the semi-solid carrier of ointments and the solid phase of particulate solids, e.g., pellets, granules, dusts and powders.

The exact concentration of the salicylanilides of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the salicylanilide employed to supply the desired dosage generally will be in the range of 0.001 to 50 percent by weight. When the extending agent is a semi-solid or solid, the concentration of the salicylanilide employed to supply the desired dosage generally will be in the range of 0.1 to 25 percent by weight. From a practical point of view, the manufacturer must supply the agriculturist with a low cost concentrate or spray base or particulate solid base in such form that, by merely mixing with water or solid extender (e.g., powdered clay or talc) or other low cost material available to the agriculturist at the point of use, he will have an easily prepared insecticidal spray or particulate solid. In such a concentrate composition, the salicylanilide generally will be present in a concentration of 5 to 95 percent by weight, the residue being any one or more of the well known insecticidal adjuvants, such as the surface-active clays, solvents, diluents, carrier media, adhesives, spreading agents, humectants, and the like.

There are a large number of organic liquids which can be used for the preparation of solutions, suspensions or emulsions of the salicylanilides of this invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like.

In certain instances, it is advantageous to employ a mixture of organic liquids as the extending agent, e.g., an aromatic hydrocarbon and an aliphatic ketone.

When the salicylanilides of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The salicylanilides of this invention are preferably supplied to the insect pests or to the environment of the insect pests in the form of emulsions or suspensions. Emulsions or suspensions are prepared by dispersing the salicylanilides of this invention either per se or in the form of an organic solution thereof in water with the aid of a water-soluble non-ionic surfactant. The term "surfactant" as employed here and in the appended claims is used as in volume II of Schwartz, Perry and Berch's "Surface Active Agents and Detergents" (1958, Interscience Publishers, Inc., New York), in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition, page 280). The surfactants contemplated are the well-known capillary active substances which are non-ionizing (or non-ionic) and which are described in detail in volumes I and II of Schwartz, Perry and Berch's "Surface Active Agents and Detergents" (1958 Interscience Publishers, Inc., New York), and also in the November 1947 issue of Chemical Industries (pages 811–824), in an article entitled, "Synthetic Detergents," by John W. McCutcheon and also in the July, August, September and October 1952, issues of Soap and Sanitary Chemicals under the title, "Synthetic Detergents." The disclosures of these articles with respect to non-ionizing capillary active substances are incorporated in this specification by reference in order to avoid unnecessary enlargement of this specification. The preferred surfactants are the water soluble non-ionic surface-active agents set forth in U.S. 2,846,398 (issued August 5, 1958).

The salicylanilides of this invention can be dispersed by suitable methods (e.g., tumbling or grinding) in solid extending agents either of organic or inorganic nature and supplied to the insect pests environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or by addition of water-soluble non-ionic surfactants the dry particulate solids can be rendered wettable by water so as to obtain stable aqueous dispersions or suspensions suitable for use as sprays.

For special purposes the salicylanilides of this invention can be dispersed in a semi-solid extending agent such as petrolatum with or without the aid of solubility promotors and/or non-ionic surfactants.

In all of the forms described above the dispersions can be provided ready for use in combatting insect pests or they can be provided in a concentrated form suitable for mixing with or dispersing in other extending agents. As illustrative of a particularly useful concentrate is an intimate mixture of a salicylanilide of this invention with a water-soluble non-ionic surfactant which lowers the surface tension of water in the weight proportions of 0.1 to 20 parts of surfactant with sufficient of the salicylanilide of this invention to make 100 parts by weight. Such a concentrate is particularly adapted to be made into a spray for combatting various forms of insect pests by the addition of water thereto. As illustrative of such a concentrate is an intimate mixture of 20 parts by weight of 2′,4′,5,5′-tetrachloro-3-phenylsalicylanilide and 2 to 5 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for combatting insect pests is a solution (preferably as concentrated as possible) of a salicylanilide of this invention in an organic solvent therefor. The said liquid concentrate preferably contains dissolved therein a minor amount (e.g., 0.5 to 15 percent by weight of the weight of the new insecticidal agent) of a non-ionic surfactant, which surfactant is also water-soluble. As illustrative of such a concentrate is a solution of 3′,4′,5-trichloro-3-phenylsalicylanilide in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

In all of the various dispersions described hereinbefore for insecticidal purposes, the active ingredient can be one or more of the salicylanilides of this invention. The salicylanilides of this invention can also be advantageously employed in combination with other pesticides, including, for example, nematocides, bactericides, and herbicides. In this manner it is possible to obtain mixtures which are effective against a wide variety of pests and other forms of noxious life.

In controlling or combatting insect pests the salicylanilides of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g., agricultural soil or other growth media or other media attractable to the pests for habitational or sustenance or propagational purposes, in any conventional fashion which permits the insects pests to be subject to the insecticidal action of the salicylanilides of this invention. Such dispersing can be brought about by applying sprays or particulate solid compositions to a surface infested with the insect pests or attractable to the pests, as, for example, the surface of an agricultural soil or other habitat media such as the above ground surface of host plants by any of the conventional methods, e.g., power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

The embodiments of the invention, in which an exclusive property or privilege is claimed, are defined as follows:

1. The method of combatting insects which comprises subjecting the insects to the action of an insecticidal amount of at least one 5-halo-3-phenylsalicylanilide of the formula

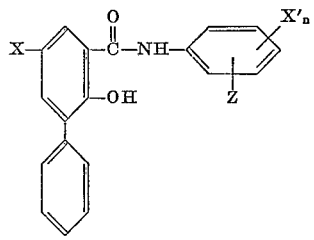

wherein X is halogen of atomic weight in the range of 35 to 80, wherein Z is selected from the group consisting of hydrogen and methyl, wherein X′ is halogen of atomic weight in the range of 18 to 80, and wherein $n$ is a whole number from 1 to 3.

2. The method of combatting chewing insects which comprises applying to the insect host an insecticidal amount of at least one 5-chloro-3-phenylsalicylanilide of the formula

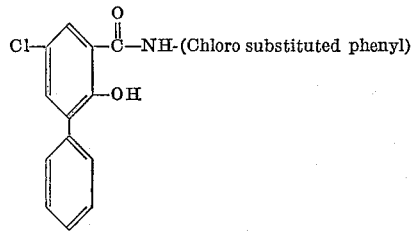

wherein the chloro substituted phenyl has from 1 to 3 chlorine substituents and wherein the phenyl nucleus of the said chloro substituted phenyl is free of a chloro substituent on a carbon atom ortho to the —NH— group.

3. The method of combatting chewing insects which comprises applying to the insect host an insecticidal amount of 2′,4′,5,5′-tetrachloro-3-phenylsalicylanilide.

4. The method of combatting chewing insects which comprises applying to the insect host an insecticidal amount of 3′,4′,5-trichloro-3-phenylsalicylanilide.

5. The method of combatting chewing insects which comprises applying to the insect host an insecticidal amount of 2′,5,5′-trichloro-3-phenylsalicylanilide.

6. The method of combatting chewing insects which comprises applying to the insect host an insecticidal amount of 2′,4′,5-trichloro-3-phenylsalicylanilide.

7. The method of combatting chewing insects which comprises applying to the insect host an insecticidal amount of 3′,5,5′-trichloro-3-phenylsalicylanilide.

8. The method of claim 2 wherein the chewing insects are species of the order Lepidoptera.

9. The method of claim 2 wherein the chewing insects are species of the family Phalaenidae.

References Cited by the Examiner
UNITED STATES PATENTS 2,865,861  12/1958  Stephens _____ 252—107

OTHER REFERENCES

Beran et al., Mitteilungen Chemischen Forchungs Institutes der Industry Osterreichs, vol. 5, pages 43–49, June 1951.

LEWIS GOTTS, *Primary Examiner.*